(12) United States Patent
Ragland et al.

(10) Patent No.: US 6,586,111 B2
(45) Date of Patent: Jul. 1, 2003

(54) CORRUGATED MULTILAYER METAL FOIL INSULATION PANELS AND METHODS OF MAKING

(75) Inventors: Christopher V. Ragland, Duluth, GA (US); Raymond E. Ragland, Union, MO (US); Matthew S. Remke, Atlanta, GA (US); J. Bradley Pearce, Snellville, GA (US)

(73) Assignee: ATD Corporation, Suwanee, GA (US)

( * ) Notice: Subject to any disclaimer, the term of this patent is extended or adjusted under 35 U.S.C. 154(b) by 0 days.

(21) Appl. No.: 10/124,094

(22) Filed: Apr. 16, 2002

(65) Prior Publication Data

US 2002/0119339 A1 Aug. 29, 2002

Related U.S. Application Data

(62) Division of application No. 09/422,140, filed on Oct. 20, 1999, now Pat. No. 6,391,469.
(60) Provisional application No. 60/104,909, filed on Oct. 20, 1998.

(51) Int. Cl.[7] .............................. B32B 3/00; B32B 3/12; B21D 11/08; B21D 13/00
(52) U.S. Cl. ........................ 428/593; 428/600; 428/635; 72/379.2; 72/379.6
(58) Field of Search ................................. 428/593, 600, 428/635; 72/379.6, 379.2

(56) References Cited

U.S. PATENT DOCUMENTS

| | | |
|---|---|---|
| 1,000,758 A | 8/1911 | Rude |
| 1,011,698 A | 12/1911 | Woollett |
| 1,987,798 A | 1/1935 | Ruppricht |
| 2,045,733 A | 6/1936 | Spafford |
| 2,212,481 A | 8/1940 | Sendzimir |
| 2,261,307 A | 11/1941 | Still |
| 2,481,046 A | 9/1949 | Scurlock |
| 3,573,430 A | 4/1971 | Eisler |
| 4,089,324 A * | 5/1978 | Tjaden ..................... 126/666 |
| 4,152,302 A | 5/1979 | Nonnenmann et al. |
| 4,461,665 A | 7/1984 | Schertler |
| 5,014,481 A | 5/1991 | Moe |
| 5,068,218 A | 11/1991 | Nishizawa |
| 5,134,014 A | 7/1992 | Zaima et al. |
| 5,729,902 A | 3/1998 | Wieres et al. |
| 5,795,658 A | 8/1998 | Bode et al. |
| 5,939,212 A | 8/1999 | Ragland et al. |
| 6,186,270 B1 | 2/2001 | Roller et al. |

FOREIGN PATENT DOCUMENTS

| | | |
|---|---|---|
| EP | 0697559 A2 | 2/1996 |
| GB | 2 270 555 A | 3/1994 |
| JP | 08 173823 A | 7/1996 |

OTHER PUBLICATIONS

PCT/US99/24674—PCT International Search Report (no date).

* cited by examiner

Primary Examiner—John J. Zimmerman
Assistant Examiner—Jason L Savage
(74) Attorney, Agent, or Firm—Burns, Doane, Swecker & Mathis, L.L.P.

(57) ABSTRACT

Multilayer metal foil pads or panels for heat or sound insulation or shielding comprising two or more corrugated metal foil or metal sheet layers wherein a flat metal foil or metal sheet layer is positioned between each pair of corrugated layers. The corrugated layers and/or the flat layers may be embossed, patterned or textured to enhance performance of the pad or panel. A preferred pad or panel comprises an embossed, patterned or textured flat exterior layer adapted for contacting the surface to be insulated or shielded to provide air space between the pad or panel and the surface and to separate the first corrugated layer from the surface. Methods are provided for making the pads and panels, which are useful in automotive applications, food cooking devices and other uses.

23 Claims, 1 Drawing Sheet

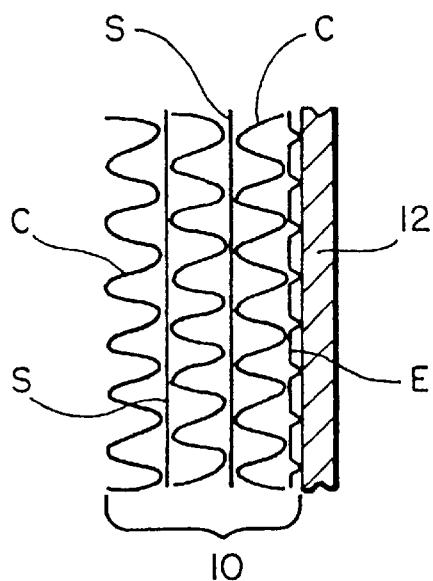
FIG_1
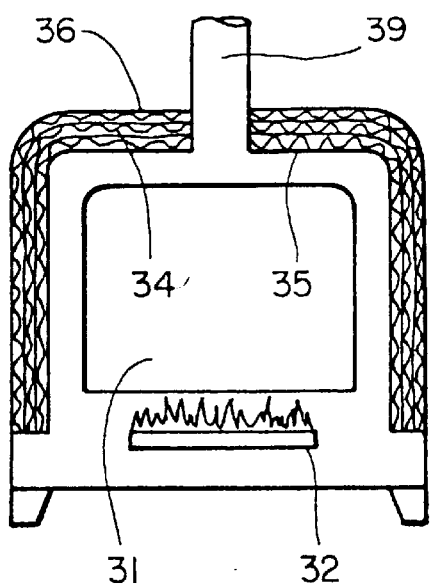
FIG_3
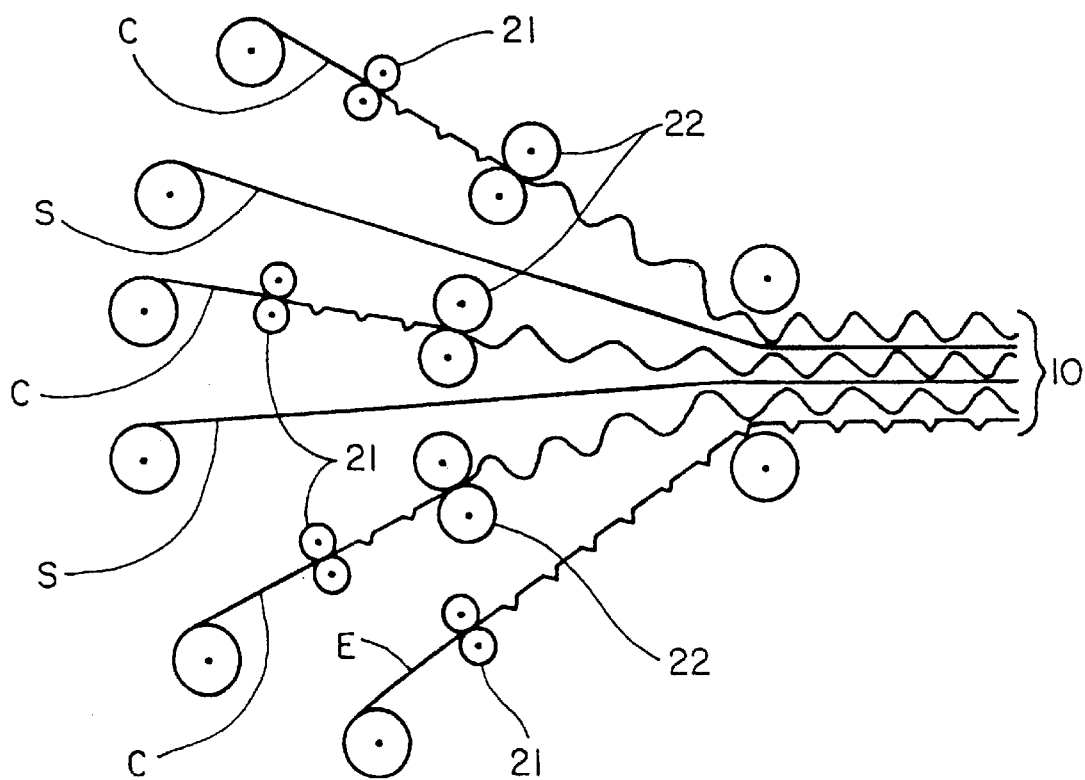
FIG_2

CORRUGATED MULTILAYER METAL FOIL INSULATION PANELS AND METHODS OF MAKING

This application is a divisional of U.S. patent application Ser. No. 09/422,140, filed on Oct. 20, 1999 now U.S. Pat. No. 6,391,469, which claims priority to Provisional U.S. Patent Application Ser. No. 60/104,909, filed in Oct. 20, 1998; the entire content of which is hereby incorporated by reference.

FIELD OF THE INVENTION

This invention relates to multilayer metal foil and metal sheet structures which have utility as heat and acoustic shields and insulating panels.

BACKGROUND OF THE INVENTION

Multilayer metal foil insulation has been used for many years, as illustrated by U.S. Pat. No. 1,934,174. Such metal foil insulation has typically been used in high temperature applications for reflective heat insulation. In those applications, the layers of metal foils are embossed to provide separation between the layers, and the stack of layers are protected in a container or rigid cover to prevent the stack of metal foils from becoming compressed at any portion, which would decrease the heat insulation value of the stack.

U.S. Pat. No. 5,011,743 discloses that multilayer metal foil insulation can provide enhanced performance as a heat shield when a portion of the multilayer metal foil is compressed to provide a heat sink area through which heat is collected from the insulating portions of the stack and dissipated from the heat shield. Such multilayer metal foil heat shields are formed from a stack of embossed metal foil layers by compressing portions of the stack to create the desired heat sink areas. The layers are attached to each other or stapled together to prevent the layers from separating. The heat shields and acoustic shields formed according to the disclosure of the U.S. Pat. No. 5,011,743 are typically compressed in the heat sink areas and cut to a desired pattern. Such multilayer metal foil heat shields do not normally have sufficient structural strength for stand-alone use in many applications. For many applications, the metal foil heat shields are typically attached to a structural support member or pan to provide a final assembly which is then placed in service as a heat shield or acoustic shield. The support members are typically metal pans, metal stampings or metal castings. Typical applications for such heat shield assemblies include automotive heat shield applications.

U.S. Pat. No. 5,763,857 discloses a heating appliance with a metal foil insulating jacket comprising air tight chambers.

The disclosures of the above patents are incorporated herein by reference.

SUMMARY OF THE INVENTION

It is an object of this invention to provide an improved multilayer metal foil insulation structure which is suitable for use in heat shield or heat insulation applications and/or acoustical insulation panel applications.

The corrugated multilayer metal foil structure according to this invention comprises a stack of metal foil layers which is formed from the combination of at least two corrugated layers separated by an intermediate metal foil separation layer, wherein the separation layer is preferably not corrugated, but is relatively flat in nature. Preferably the multilayer metal foil structure comprises at least five layers: three corrugated layers and two separation layers. The multilayer metal foil structure can further comprise an exterior metal foil layer suitable for contact with the body, member or surface on which the insulating structure is applied or suitable for protection of the stack from environmental damage. The channels formed by the corrugations and between a corrugated layer and the adjacent separation layer can be sealed to form elongated isolated air spaces or can be left open at the ends and adapted to act as gas flow conduits through the structure whereby heat can be spread more evenly throughout the structure, or can be directed from a hotter zone to a cooler zone or can be removed from the interior of the structure. The multilayer metal foil structures of this invention provide a wide variety of design options for heat insulation, heat spreading and heat management in any particular application.

In one aspect this invention provides improved insulation and heat management in commercial food preparation ovens, particularly in the gas fired, indirect heated ovens, i.e., wherein the flame and resulting combustion gasses are outside and separate from the food compartment (also known as "air wash" ovens). Conventional insulation, such as fiber glass, loses its effectiveness over time due to contamination. The multilayer metal foil structure of this invention in combination with food preparation ovens provides ovens of improved performance in terms of uniformity of temperature within the oven and in terms of life cycle of the oven, because the structures of this invention are more durable and need less insulation replacement or repair over time compared to conventional insulation. While the structures of this invention are advantageous in any oven wall insulation, they are particularly preferred for use in air wash ovens to insulate between the exterior wall of the oven cabinet and the heating chamber surrounding the cooking chamber.

This invention further provides methods of making the multilayer metal foil structures by forming the corrugated layers and separation layers in desired configurations and patterns, then assembling the stack of layers with any optional exterior layer desired. In a preferred method of forming the structures of this invention the individual metal layers are continuously supplied from rolls, corrugated, embossed or patterned as desired and assembled continuously into a stack. Then desired parts, pads, panels or other shapes are cut from the stack for final assembly into the end use product, such as ovens, automobiles, and the like, and can be shaped into any desired three dimensional shape before such final assembly.

BRIEF DESCRIPTION OF THE DRAWINGS

FIG. 1 is a cross section view of a multilayer metal foil structure according to this invention placed on a surface to be insulated or shielded.

FIG. 2 is an illustration of a method of assembly of the multilayer metal foil structure of this invention.

FIG. 3 is a cross section view of an oven in which the multilayer metal foil structures of this invention is used.

DESCRIPTION OF THE INVENTION

This invention is best described by reference to the drawings. In FIG. 1 multilayer metal foil structure 10 is shown positioned adjacent to the wall 12 of a vessel to be insulated, such as the inside surface of an oven exterior wall. The layers of the structure are designated C for the corrugated layers, S for separation layers and E for exterior layers.

The characteristics and physical requirements of each layer can be illustrated as follows. The corrugated layers C are corrugated to provide the height and spacing desired for a particular application, such as 0.25 inch height/depth and 0.75 inch period (top ridge to top ridge). Conventional corrugation equipment can be used, and any desired shape corrugations can be used, such as sinusoidal, angular, etc. The individual metal foil sheet can be embossed, patterned or otherwise shaped or treated before it is corrugated for assembly with the separation layers to form the structure of this invention. Moreover, an individual corrugated layer C in this invention can itself comprise multiple metal foil layers which have been corrugated together or corrugated separately then nested. U.S. Pat. No. 5,939,212 illustrates such multilayer corrugated foils that can be used as a corrugated layer C in this invention. The corrugated layers C can be single foil layers which have been embossed or corrugated in a stack of several foils then separated to individual embossed and/or corrugated foil layers for use as layer C in the structure of this invention.

The separation layers S in this invention as illustrated in FIG. 1 can be flat, embossed, patterned or otherwise prepared or textured. Separation layers S can also be corrugated, provided that the corrugations are at an angle or otherwise positioned so that the separation layers S do not nest with corrugated layers C but remain in position to separate the corrugated layers C from the other corrugated layers C. Separation layers S can themselves comprise multiple layers of metal foils, provided the multiple layers act as separation layers S to separate the corrugated layers C. The separation layers S can be single foil layers which have been embossed or corrugated in a stack of several foils then separated to individual embossed and/or corrugated foil layers for use as layer S in the structure of this invention.

Exterior layer E can be flat, but is preferably embossed, patterned or otherwise adapted to provide air gaps between exterior layer E and a wall member 12 against which the multilayer metal foil structure of this invention is applied. While an exterior layer E is preferred for contact with a wall or surface, the multilayer metal foil structure of this invention can be used by placing a corrugated layer C against the wall or surface of the member to be insulated or shielded.

In a preferred aspect of this invention, any or all of the layers of the multilayer metal foil structure of this invention may be embossed or otherwise textured or patterned. Separation layers S and exterior layers E may be embossed to provide air gaps or contribute to the air gaps between the adjacent layer or structure. Corrugated layers C are preferably embossed before the layers are corrugated. It has surprisingly been found that the embossments are not flattened during the corrugation, but retain all or almost all of the embossed configuration through the corrugation process.

As used herein in the description of this invention, the terms "emboss," "embossed" or "embossment" are intended to include the conventional meaning as well as forming textured, patterned or other forms of relief in the plane of the foil or sheet layer. Such embossments in a layer of the structure of this invention provide or contribute to providing air gap or spacing between the layer and an adjacent layer or the surface on which the structure is used.

The embossments are preferably of the shape which produce points at the apex of each embossment. The points may be slightly rounded or may be sharp points. The points of the embossments provide minimal contact between the layers to minimize conduction of heat from one layer to another. It is also preferred that the embossment tool or roll used produce pointed sharp embossments wherein the points of the embossments are pierced through the foil to create small openings in the foil layer at the points of the embossments. The perimeters of these openings are formed of the vertical edges of the burst or punctured foil. These vertical edges surrounding the opening at the point or peak of each embossment provide even smaller point contact, more of the nature of a knife-edge type contact, of the embossed foil layer with the adjacent layer, which further reduces heat conduction between such an embossed layer and an adjacent layer.

It is to be understood that in the structure of this invention as illustrated above, corrugated layers C can all be identical or can each be different in corrugation pattern or other characteristics. Similarly, separation layers S can all be identical or can each be different in characteristics. The direction or angles of corrugations can be varied and adjusted by one skilled in the art according to the disclosure herein to provide desired results. The layers can be sealed to provide sealed air pockets or can be oriented with open ends to provide channels through which air or gases can flow to distribute heat across the pad or panel or to remove heat from the pad or panel comprising the multilayer metal foil structure of this invention.

A particular advantage of the structure of this invention is provided by the combination of the corrugated layers C and the separation layers S which enable orienting the corrugated layers C in any direction relative to one another without concern for the corrugated layers C nesting with each other and losing the desired spacing between layers. Separation layers S of this invention maintain the separation and spacing of the corrugated layers C. A particularly advantageous configuration of the structure of this invention is where the corrugation channels of the corrugation layers C are all oriented in a parallel direction. The channels of the corrugated layers C in combination with the flat separation layers S form conduits through which air or other gases can move or circulate to move or spread heat through the structure. Without the flat separation layers S in such a structure, the corrugated layers C would tend to nest and spacing between layers and the channels formed would be lost.

FIG. 2 illustrates an assembly method and equipment for making the multilayer metal foil structures of this invention in a continuous process. Corrugated layers C are supplied from rolls of metal foil, optionally embossed by embossing tools 21, corrugated between corrugating rolls 22, then assembled into the stack forming the structure of this invention. Separation layers S are supplied from rolls of metal foil and assembled into the stack forming the structure of this invention. Exterior layer E is likewise supplied from a roll and assembled into the stack. The resulting stack 10 is then cut or shaped to form desired parts, panels, pads or shields for desired uses. As noted above, each or all of the separation layers S and/or exterior layer E can be embossed, patterned, etc., as desired for particular applications. As is apparent, the structure of this invention may be assembled in a batch fashion by assembling individual preformed foils or sheets having the desired corrugations, embossments and the like.

The layers comprising the multilayer metal foil structure of this invention can be held together by any means desired, such as crimps, clips, pins, clamps, bands and the like. For example, the edge areas can be compressed, perforated and interlocked as disclosed in U.S. Pat. No. 5,800,905; or the edge areas can be welded as disclosed in U.S. Pat. No. 5,524,406. The multilayer structure of this invention can be combined with other elements, such as support pans, hangers, etc., depending on end use application.

FIG. 3 illustrates a cross section of an air wash oven comprising food cooking chamber 31, burner 32, insulation 34 contained between inner wall 35 and cabinet or outer wall 36, and vent 39. The multilayer metal foil structure of this invention is useful as insulation 34 to contain heat at wall 35 and prevent over heating of exterior wall 36. In some embodiments of this invention, the channels formed in the corrugations of corrugated layers C can be oriented to provide air flow up towards vent 39. In other embodiments the corrugation channels closer to wall 35 can be so oriented, while corrugation channels closer to wall 36 can be sealed to provide insulating air pockets or can be oriented so the corrugations provide horizontal channels to provide relatively stagnant compartments with little if any air flow through them.

The materials useful in the corrugated stacks of this invention will likewise be apparent to one skilled in the art and will include typically aluminum, stainless steel, copper, similar metal foils and metal sheets, plastic coated metal foils and sheets, laminates of metals, alloys of these and other metals, and metallic materials which are plastically deformable and are permanently deformable. In addition to metal, other materials may be interlayered between two or more of the metal foil layers of the multilayer structure of this invention. For example, plastic films, adhesive layers, spray on adhesives, coatings, etc. may be included between the metal foil layers, particularly in acoustic applications where additional sound damping is desired. The thickness of the various metal and other layers employed will depend on the end use application. It is preferred that the multilayer structure be made primarily of metal foils having a thickness of 0.006 in. or less and in particular it is preferred that in, for example, a five layer structure, at least the three interior layers are thin metal foils, for example 0.002 in. thick metal foils. The exterior layers of an all-foil structure are frequently desired to be heavier metal foils of 0.005 in. or 0.006 in. in thickness. Likewise, when the exterior layers are desired to be protective layers, they may be metal sheets of 0.010 or even up to 0.050 in. in thickness. In this regard, it is also recognized that the multilayer metal structures of this invention can be a non-foil structure made partially or entirely of layers of metal sheets thicker than metal foils, i.e., metal sheets having thicknesses in excess of 0.006 in. Thus, any metal foil layer described herein can be a metal sheet layer. For example, flexible corrugated multilayer metal structures according to this invention can be made using five layers, three corrugated layers and two separation layers, of 0.010 in. thick metal sheets.

The number of layers and the thicknesses of each layer will be selected by one skilled in the art depending on the flexibility desired, the vertical strength required in the final corrugated product, the capacity for lateral heat transfer, the requirements for sound damping, etc. The thickness of various metal foil layers may vary from 0.0008 to 0.006 in., with the 0.002 in. and 0.005 in. metal foils being preferred for many applications. When heavier sheets are used and in particular for the top sheets or protective exterior sheets, the metal sheets can have a thickness of greater than 0.006 in. up to about 0.050 in., with the preferred top sheets or exterior sheets having a thickness of 0.010 in. to about 0.030 in. Some examples of combinations of number of layers and thicknesses of the alternating corrugated and separation layers used in forming the multilayer metal foil structures of this invention are: (in mils, 1 mil=0.001 in.) 10/2/2/2/5; 5/2/2/2/5; 2/2/2/2/2/5; 5/2/2/2/2/10; 8/2/2/2/4; 10/2/2/10; 5/2/2; 5/0.8/0.8/5; and 10/2/0.8/0.8/2/5. Examples of non-foil metal sheet structures are: 10/8/8/8; 30/10/10/10/30; 8/8/8; and 50/8/8/10. The foil and sheet materials useful in this invention are similar to those disclosed in U.S. Pat. Nos. 5,958,603; 5,939,212 and PCT Application Publication No. WO 98/44835, the disclosures of which are incorporated herein by reference.

Panels or pads made according to the multilayer structure of this invention will preferably have a total thickness from about 0.5 inch to about 1.0 inch or greater, depending on the number of layers, height of corrugations, height of embossments, etc., desired for a particular shielding or insulating application. For example, a typical 5-layer panel or pad (3 corrugated layers and 2 separation layers) will have a total thickness of between about 0.75 and 1.0 inch, preferably between about 0.8 and 0.9 inch. Similar thickness may be employed in such a 5-layer structure with an exterior layer E added as the sixth layer. A typical corrugation height (thickness of a single corrugated layer) will be between about 0.1 and 0.5 inch and preferably between about 0.2 and 0.4 inch. A typical embossment height will be between about 0.010 and 0.1 inch, preferably between about 0.020 and 0.080 inch, with 0.050 inch being a typical embossment height.

Other variations of the methods of making and the structures of the present invention as well as end use application designs will be apparent to one skilled in the art following the teachings of this invention.

We claim:

1. A method of making a substantially flat multilayer metal foil insulation planar assembly comprising corrugating first and second metal foil layers, embossing a first flat metal foil layer, and assembling the first and second corrugated metal foil layers (a) with a second flat metal foil layer positioned between the first and second corrugated metal foil layers and (b) with the embossed or patterned first flat metal foil layer on the side of the first corrugated metal foil layer opposite the second flat metal foil layer.

2. A method according to claim 1 comprising embossing the second flat metal foil layer before assembling same between the two corrugated layers.

3. A method according to claim 1 or 2 comprising corrugating a third metal foil layer and assembling same adjacent to the second corrugated metal foil layer with a flat metal foil layer positioned between the second and third corrugated metal foil layers.

4. A multilayer metal foil insulation pad comprising two corrugated metal foil layers separated by a flat metal foil layer positioned between said corrugated layers and having on the outside of one of said corrugated layers an embossed flat metal foil exterior layer adapted for contact with a surface to be insulated wherein the exterior layer of the pad is adapted for contact with a surface to be insulated and adapted to provide air space between the exterior layer and the surface.

5. The multilayer metal foil insulation pad of claim 4 comprising three corrugated metal foil layers and a first flat metal foil layer positioned between the first and second corrugated metal foil layers and a second flat metal foil layer positioned between the second and third corrugated layers.

6. The multilayer metal foil insulation pad of claim 4 or 5 wherein a flat metal foil layer positioned between corrugated layers is embossed or patterned.

7. The multilayer metal foil insulation of claim 4 or 5 wherein at least one of the corrugated metal foil layers is embossed or patterned.

8. The multilayer metal foil insulation pad of claim 4, wherein the corrugated metal foil layer has a thickness of between about 0.1 and 0.5 inches.

9. The multilayer metal foil insulation pad of claim 4, wherein the flat metal foil layer has a thickness of between about 0.010 and 0.10 inches.

10. A substantially flat multilayer metal foil insulation pad comprising two corrugated metal foil layers separated by a flat metal foil layer positioned between said corrugated layers and having on the outside of one of said corrugated layers an embossed flat metal foil exterior layer adapted for contact with a surface to be insulated wherein the exterior layer of the pad is adapted for contact with a surface to be insulated and adapted to provide air space between the exterior layer and the surface.

11. The multilayer metal foil insulation pad of claim 10 comprising three corrugated metal foil layers and a first flat metal foil layer positioned between the first and second corrugated metal foil layers and a second flat metal foil layer positioned between the second and third corrugated layers.

12. The multilayer metal foil insulation of claim 10 or 11 wherein at least one of the corrugated metal foil layers is embossed or patterned.

13. The multilayer metal foil insulation pad of claim 10 or 11, wherein the flat metal foil layer positioned between corrugated layers is embossed or patterned.

14. The multilayer metal foil insulation pad of claim 10, wherein the corrugated metal foil layer has a thickness of between about 0.1 and 0.5 inches.

15. The multilayer metal foil insulation pad of claim 10, wherein the flat metal foil layer has a thickness of between about 0.010 and 0.10 inches.

16. A substantially flat multilayer metal foil insulation pad comprising two corrugated metal foil layers separated by a flat metal foil layer positioned between said corrugated layers wherein an exterior layer of the pad is adapted for contact with a surface to be insulated and adapted to provide air space between the exterior layer and the surface, wherein the flat metal foil layer positioned between corrugated layers is embossed or patterned.

17. The multilayer metal foil insulation of claim 16, wherein at least one of the corrugated metal foil layers is embossed or patterned.

18. The multilayer metal foil insulation pad of claim 16, wherein the corrugated metal foil layer has a thickness of between about 0.1 and 0.5 inches.

19. The multilayer metal foil insulation pad of claim 16, wherein the flat metal foil layer has a thickness of between about 0.010 and 0.10 inches.

20. A substantially flat multilayer metal foil insulation pad comprising three corrugated metal foil layers and a first flat metal foil layer positioned between the first and second corrugated metal foil layers and a second flat metal foil layer positioned between the second and third corrugated layers wherein an exterior layer of the pad is adapted for contact with a surface to be insulated and adapted to provide air space between the exterior layer and the surface, and wherein the flat metal foil layers positioned between the corrugated layers is embossed or patterned.

21. The multilayer metal foil insulation of claim 20, wherein at least one of the corrugated metal foil layers is embossed or patterned.

22. The multilayer metal foil insulation pad of claim 20, wherein the corrugated metal foil layer has a thickness of between about 0.1 and 0.5 inches.

23. The multilayer metal foil insulation pad of claim 20, wherein the flat metal foil layer has a thickness of between about 0.010 and 0.10 inches.

* * * * *